United States Patent [19]

Hallstrom

[11] Patent Number: 5,228,555
[45] Date of Patent: Jul. 20, 1993

[54] LOAD POSITIONING AND CONVEYING SYSTEM

[76] Inventor: Olof A. Hallstrom, 1920 Hallstrom Rd., Tillamook, Oreg. 97141

[21] Appl. No.: 868,511

[22] Filed: Apr. 15, 1992

[51] Int. Cl.$^5$ .............................................. B65G 25/00
[52] U.S. Cl. .................................. 198/750; 414/525.9
[58] Field of Search ........................ 198/750, 775; 414/525.9

[56] References Cited

U.S. PATENT DOCUMENTS

| | | |
|---|---|---|
| 2,629,504 | 2/1953 | Peterson . |
| 2,973,856 | 3/1971 | Brooks ................... 414/525.9 |
| 4,143,760 | 3/1979 | Hallstrom . |
| 4,144,963 | 3/1979 | Hallstrom . |
| 4,184,587 | 1/1980 | Hallstrom . |
| 4,580,678 | 4/1986 | Foster ........................ 198/750 |
| 4,658,947 | 4/1987 | Welder ....................... 198/750 |
| 4,691,819 | 9/1987 | Hallstrom, Jr. . |
| 4,727,978 | 3/1988 | Hallstrom, Jr. . |
| 4,793,469 | 12/1988 | Foster . |
| 4,856,645 | 8/1989 | Hallstrom, Jr. . |
| 4,948,325 | 8/1990 | Hodgetts ..................... 198/750 |
| 4,966,275 | 10/1990 | Hallstrom, Jr. . |
| 5,036,759 | 8/1991 | Olmedo et al. ............... 198/750 |
| 5,096,356 | 3/1992 | Foster .......................... 198/750 |

Primary Examiner—Joseph E. Valenza
Attorney, Agent, or Firm—Kolisch, Hartwell, Dickinson, McCormack & Heuser

[57] ABSTRACT

A load positioning and conveying system includes a plurality of groups of elongate conveyors, wherein each group includes at least two conveyor slats. A conveyor drive mechanism includes a first drive unit connected to one end of the conveyor slats and a second drive unit connected to the other end of the conveyor slats. Each drive unit is constructed and arranged for selective, simultaneous and independent longitudinal shifting of the conveyor slats in a single, predetermined direction.

15 Claims, 7 Drawing Sheets

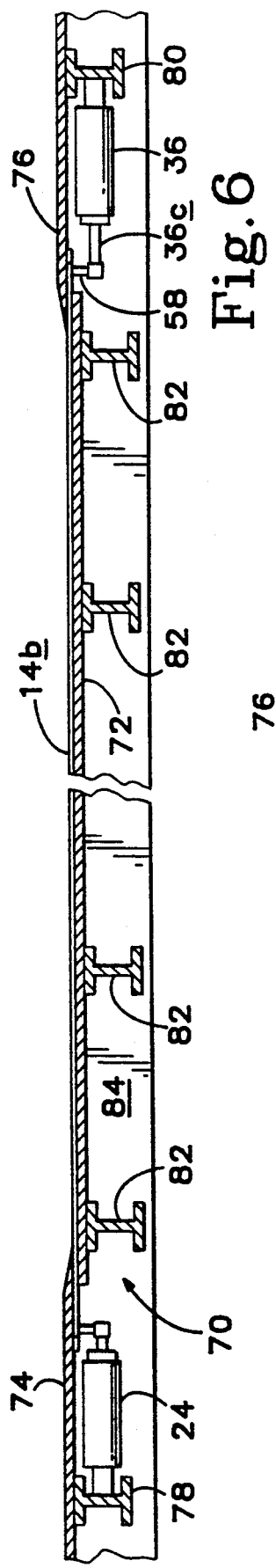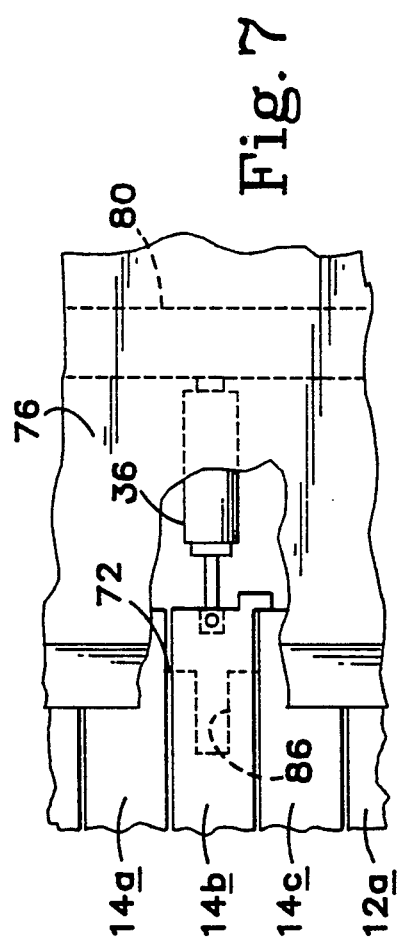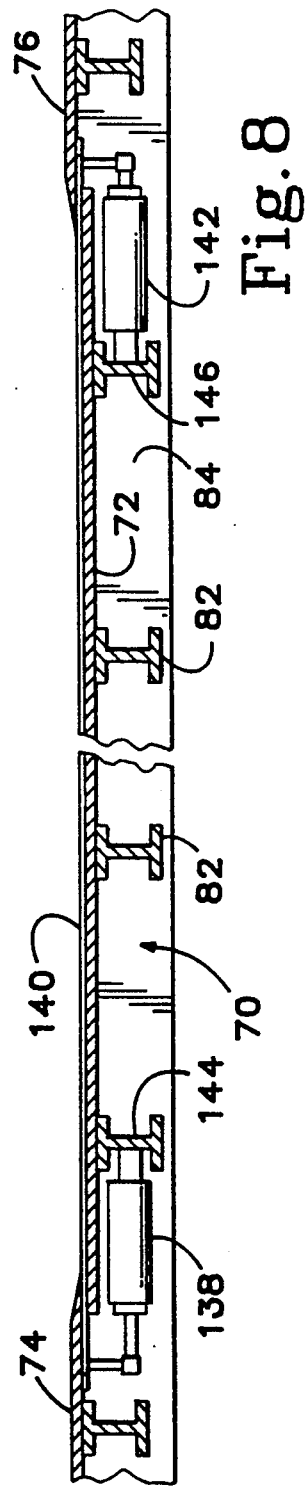

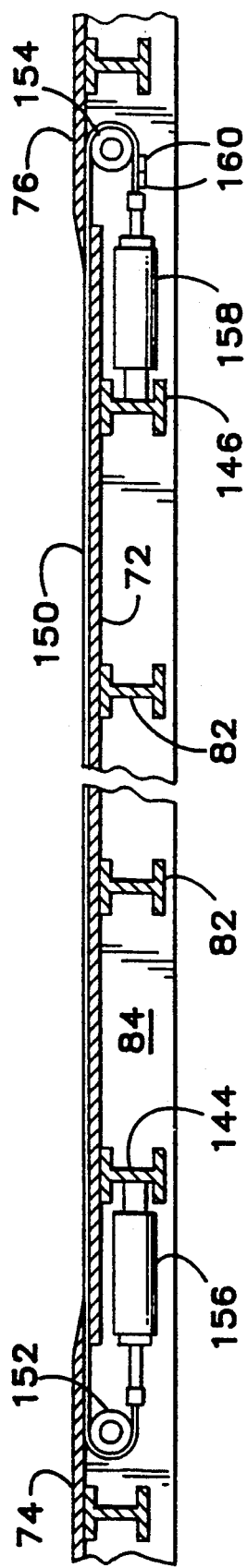
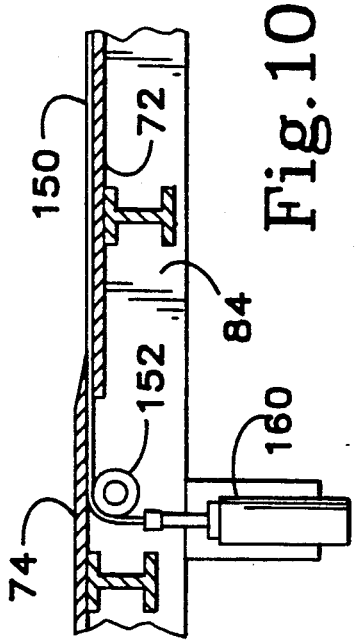
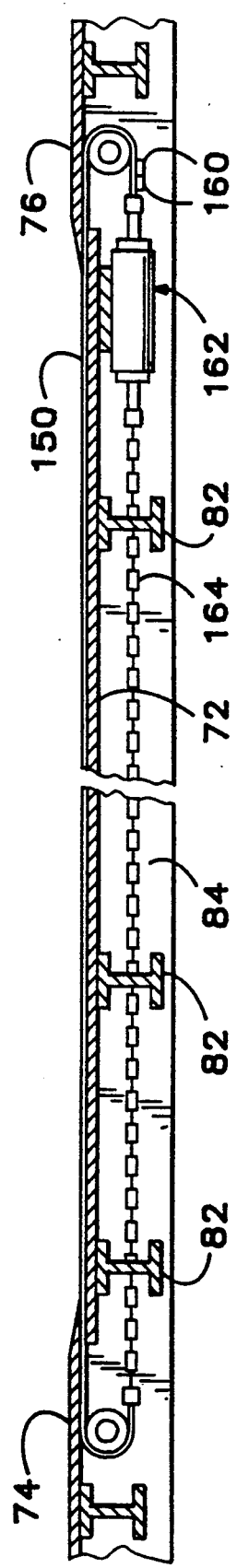

LOAD POSITIONING AND CONVEYING SYSTEM

BACKGROUND OF THE INVENTION

This invention relates to load conveying systems, and specifically to a type of load conveying system which is known as a moving floor.

Moving floors are used in a variety of material handling environments, such as warehouses and in over-the-road trailers which are used in the trucking industry. A basic concept of a moving floor or reciprocating conveyor is disclosed in my U.S. Pat. No. 4,143,760, for RECIPROCATING CONVEYOR, which describes a moving floor system having a plurality of groups of elongated slats. In that system, a hydraulic drive is operable to move all of the slats of each group from a start position simultaneously in a load-conveying direction, and then to move the slats of each group sequentially in the opposite direction from the advanced position back to the start position. In this fashion a load is conveyed in a predetermined direction.

Known reciprocating conveyor systems utilize rigid slats which are normally formed of extruded aluminum. The hydraulic drive system typically takes the form of a plurality of hydraulic cylinders, each of which is mounted to a transversely extending drive beam or cross drive, to which are mounted each of the slats of that group. Other forms which the drive system may take include a reciprocating rod extending between a pair of fixed cylinders, or a single cylinder mounted to reciprocate on a fixed shaft. With these systems the cross drives are mounted to the reciprocating rod or to the reciprocating cylinder, respectively, and the slats of each group are mounted to one of the cross drives.

Slat type conveyor systems have been extremely successful in providing a trailer-mounted loading and unloading capability for a reasonable expense, while taking up little space in the trailer. However, because the slats must extend the entire length of the trailer, and cover most of the floor thereof, even when a light weight material such as aluminum is used, the weight of the conveyor system is substantial. Also, because the load to be carried is often dropped onto the slats in the trailer, the slats will on occasion be damaged, thereby rendering the system inoperable. Also, when consideration is given to the amount of aluminum which must be used, the expense of the slats comprises a substantial percentage of the cost of the conveyor system. Finally, in order to render the conveyor system watertight, seals must be positioned between the various slats. These seals need to be replaced from time to time and thus increase the maintenance which is required to the system.

It is an object of the invention to overcome the limitations with the prior art proposals. Other more specific objects are as follows: (1) to develop a trailer-mounted reciprocating conveyor system which does not require the use of expensive slats with seals mounted therebetween; (2) the provision of a reciprocating conveyor system which can lend itself to watertight operation; (3) to provide a conveyor system which is similar to conventional slat type conveyors except that flexible bands are used in place of the slats, such bands being less susceptible to damage during loading operations; (4) to develop a reciprocating floor conveyor system in which slats may be operating in purely a pulling rather than a pushing mode, thereby reducing structural requirements for the slats; (5) the provision of a trailer-mounted conveyor system which uses less space and weighs less than conventional slat type conveyor systems; and (6) to develop a conveyor system which permits drive components to be mounted at various positions in or under the trailer, thereby providing a conveyor system which is usable in many different applications.

SUMMARY OF THE INVENTION

A load conveying system is provided which includes a plurality of groups of elongate conveyors, with each group including at least two conveyor bands or slats. A conveyor drive mechanism includes a first drive unit connected to one end of the conveyor slats and a second drive unit connected to the other end of the conveyor slats. Each drive unit is constructed and arranged for selective, simultaneous and independent longitudinal shifting of the conveyor slats in a single, predetermined direction by a pulling action on the slats. In one embodiment the slats are flexible and are shifted through the action of the drive unit exerting a pulling force on the slat. The drive units may be located in a variety of positions, and a number of those different embodiments are disclosed herein.

BRIEF DESCRIPTION OF THE DRAWINGS

FIG. 6 is a side elevation view of the embodiment of FIGS. 1–4.

FIG. 7 is a plan view of a portion of the embodiment of FIGS. 1–4 and 6, taken generally along the line 7—7 of FIG. 6.

FIG. 8 is a side elevation view of a third embodiment of the invention.

FIGS. 9, 10 and 11 are side elevation views of fourth, fifth and sixth embodiments of the invention.

DETAILED DESCRIPTION OF THE PREFERRED EMBODIMENTS

Figure 1:
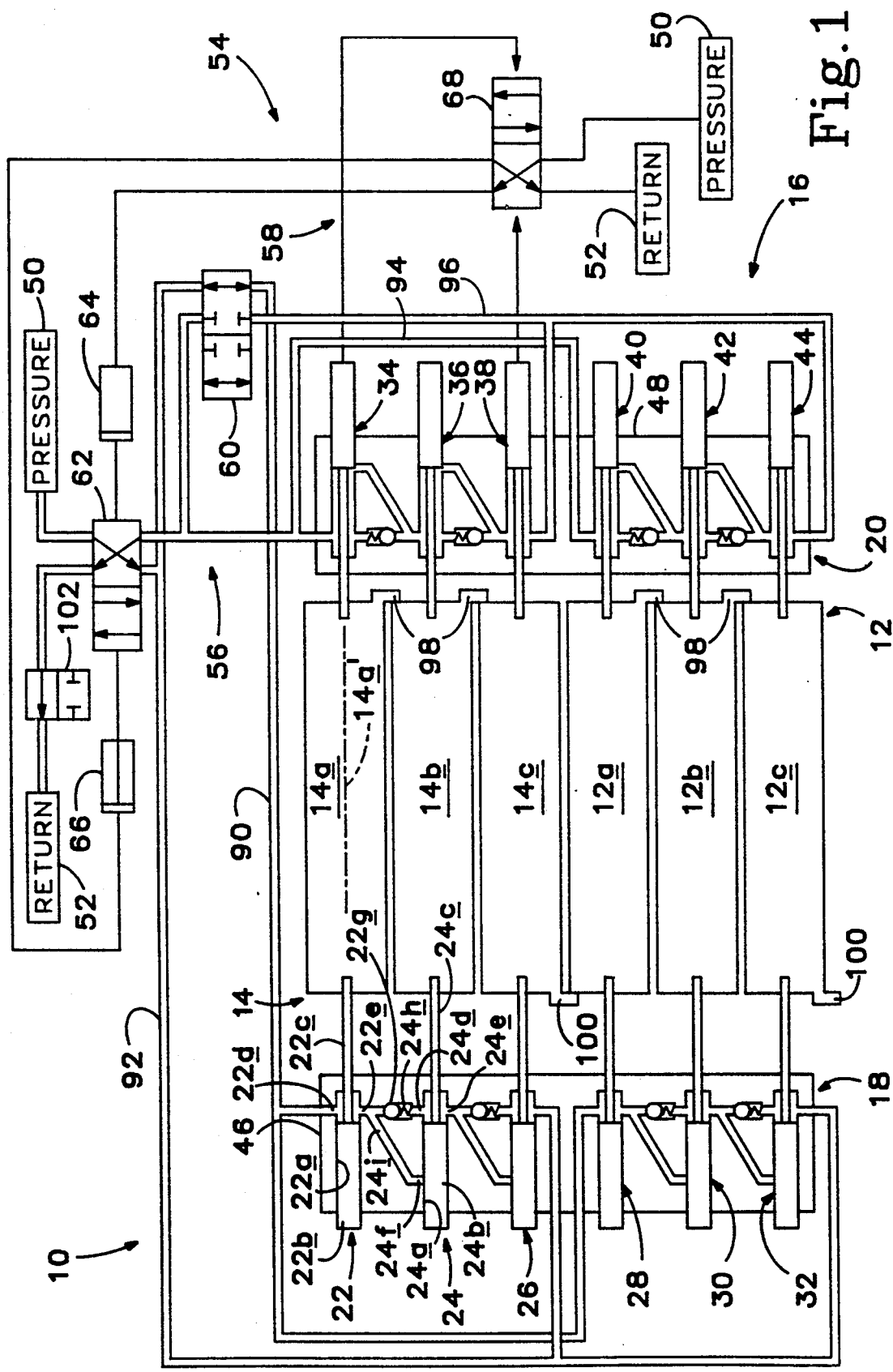
FIG. 1 is a schematic representation of a first embodiment of the invention, with control valves arranged in a position to move all of the slats in the conveyor to the left in unison.

Turning now to the drawings, and initially to FIG. 1, a schematic representation of a load conveying system is depicted at 10. System 10 includes plural groups of conveyors, two of which are depicted generally at 12 and 14. Each group of conveyors includes at least two conveyor slats. In the embodiment depicted, three such slats are shown and are designated 12a, 12b, and 12c. A like set of conveyor slats 14a, 14b and 14c are associated with group 14.

A goal of the instant invention is to provide a conveyor slat which may be formed of plastic or steel, may be flexible or rigid, and which may be provided in virtually any length. To this end, the conveyor slats are moved by what is referred to herein as a pulling action on each end of the slat. To accomplish this, a conveyor drive mechanism 16 is provided, which is operable to move the conveyor slats, either in unison or independently, along a longitudinal axis, such as axis 14a' of slat 14a.

Conveyor drive mechanism 16 includes a first drive unit 18 and a second drive unit 20. Each drive unit includes a drive device which is associated with each slat. For example, first drive unit 18 includes drive devices 22, 24, 26, 28, 30 and 32, while second drive unit includes drive devices 34, 36, 38, 40, 42 and 44. Each drive device, and using device 24 as an example, includes a cylinder 24a, a piston 24b carried in cylinder 24a, and a piston rod 24c extending between piston 24b and its associated slat 14b.

Drive device 24 includes a first fluid port 24d, a second fluid port 24e, and a third fluid port 24f. A check ball 24g is associated with first fluid port 24d of drive device 24. A spring 24h urges ball 24g toward its seat which opposes port 24d. The remaining drive devices include corresponding features except that drive devices 22, 28, 38 and 44 do not have third fluid ports, check balls or springs associated therewith.

It can be seen that for the drive devices associated with a particular group of slats, the second fluid port of one drive device is connected with the first fluid port of the adjacent drive device, with the check ball and spring provided to allow one-way flow only. The second fluid port is connected to the third fluid port of an adjacent device by means of a conduit, such as 24i.

In the depicted embodiment, the drive devices take the form of hydraulic cylinders which are formed in machined blocks 46, 48. The cylinders may also be unitary structures which are conventionally connected by hoses. The cylinders are powered by a hydraulic fluid pressure source 50. A return 52 is provided to return hydraulic fluid to pressure source 50. The arrangement of hydraulic components herein is referred to as a one-way annulus system in which the piston serves as a spooling device.

Each slat has associated therewith a drive device in first drive unit 18 and a drive device in second drive unit 20. The slats are moved along their longitudinal axis by means of a pulling force exerted on the ends of the slats.

A control mechanism 54 is provided to control the movement of the slats and the operation of the drive devices. Control mechanism 54 includes a number of valves for directing the flow of fluid through connections to the drive devices and for providing fluid under pressure and return of fluid to the hydraulic fluid pressure source. Control mechanism 54 includes a drive device control circuit, depicted generally at 56, and a system control circuit, depicted generally at 58. Although the two control circuits are depicted as having individual pressure sources and returns, it should be appreciated that a single pressure source and return may be used for both the drive device control circuit and the system control circuit.

Drive device control circuit 56 includes a directional valve 60, which is manually operated and which controls the direction which a load will be shifted along the length of the conveyor slats. Directional valve 60 is manually operated in order to select the direction of load movement.

A switching valve 62 is operable to provide fluid under pressure to either the first or second drive unit, which will determine whether the conveyor slats move in unison or sequentially. Switching valve 62 is moved by system control cylinders 64, 66 which are controlled by a system valve 68. System valve 68 is shifted between two positions by the actions of pistons 34b and 38b. Variations to this arrangement may include having a system valve shifting mechanism incorporated into the slats or into the piston rods.

Referring momentarily to FIGS. 6 and 7, the system is depicted mounted on a conveyor framework, depicted generally at 70, which includes a fixed floor 72, a slat 14b carried on fixed floor 72, upper floor segments 74, 76 and drive unit mounts 78, 80. Fixed floor 72 is supported by cross pieces 82, which abut on a side frame element 84.

Turning now to FIG. 7, the arrangement of the conveyor slats on fixed floor 72 and under upper floor segment 76 is depicted. A notch 86 is provided in fixed floor 72 to allow entry of a connection 88 between piston rod 36c and slat 14b. The conveyor slats may be flat structures and may be formed of plastic or metal, may be flexible or rigid, and may also be laid over a slightly irregular, or undulating, path.

Returning now to FIG. 1, operation of the preferred embodiment will be described. With directional valve 60 in its left position, fluid will be directed toward the drive units in a manner which will cause all of the slats in system 10 to move to the left in unison. Fluid from pressure source 50 will be supplied to all of the drive devices in first drive unit 18 in order to pull all of the slats to the left. A is apparent from the fluid path configuration, pressure will be applied at first fluid port 22d of drive device 22 simultaneously with the application of pressure at first fluid port 28d of drive device 28. Pressure is supplied through pressure conduits, such as conduits 90, 92 which supply, and allow the return of, fluid to first drive unit 18, and conduits 94, 96 which provide the same function for drive unit 20. As configured, conduit 90 is connected to the first fluid ports of the drive devices, while conduit 92 is connected to the second fluid ports of the drive devices.

As fluid pressure is applied in both conduits 90 and 92, pistons 22b and 28b will be the first units to move, and will move to the end of their travel, were it not for the presence of interlocking abutments 98, which are located on the right ends conveyor slats 12a, 12b, 14a, 14b. Right abutments 98 are operable to prevent independent movement of certain conveyor slats until other conveyor slats are also ready to move. Left abutments 100 will keep the conveyor slats within individual groups moving with those in other groups. In this instance, the action of fluid pressure on the pistons in first drive unit drive devices will be operable to shift all of the conveyor slats to the left in unison, as none of the slats will move until such time as all slats move.

Pressure is applied to all of the pistons in the first drive unit. As pressure builds up, the check balls are compressed against their respective springs to allow equal fluid pressurization throughout the first drive unit.

As the slats are pulled to the left by the drive devices in the first drive unit 18, the pistons of the drive devices in second drive unit 20 are pulled with the conveyor slats, thereby forcing fluid out of the cylinder and into pressure return 52. A tensioning valve 102 is provided, and must be in its open position, as depicted in FIG. 1, for fluid to return to the pressure source from second drive unit 20.

As pressure is applied to the drive devices in first drive unit 18, all of the slats in groups 12 and 14 shift, in unison, to the left. Therefore, any load which is carried on the conveyor slats will move with the slats to the left.

Figure 2:
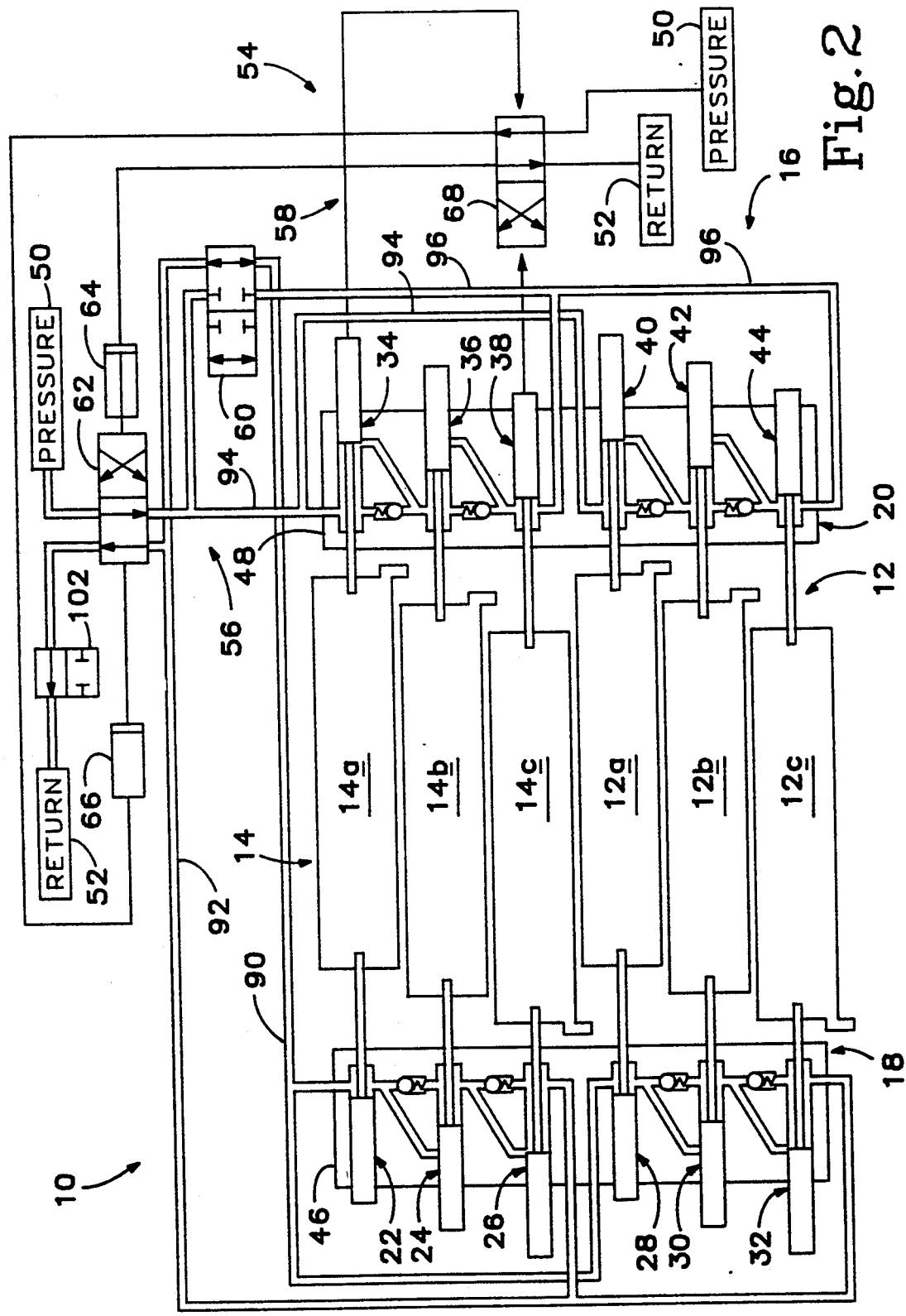
FIG. 2 depicts the embodiment of FIG. 1 with the control valves in a condition which will move all the slats one at a time to the right.

System valve 68 is connected to drive devices 34 and 38 such that it will alternately shift between a crossover position and direct fluid path position. As piston 38b is fully withdrawn into its cylinder, system valve 68 is shifted to a direct fluid path position, as depicted in FIG. 2 which causes cylinder 64, 66 to shift switching valve 62 to its direct fluid path position, thereby pressurizing conduits 94,96 and connecting conduits 90, 92 to return 52.

With pressure applied to the drive devices in second drive unit 20, the slats within each group will shift to the right one at a time. Following the fluid path in conduit 94, pressurized fluid from pressure source 50 travels through switching valve 62 into conduit 94. The pressurized fluid initially enters drive device 34 and 40 through their respective first fluid ports 34d, 40d. This causes the pistons to extend outward (to the right in FIG. 2). The piston must travel its full length before fluid is allowed to reach the next adjacent drive device through conduit 34i, 40i, as check ball 34g, 40g will prevent flow of fluid through the second fluid ports. Once the piston has completed its full travel, fluid flows through conduit 34i, 40i to the next adjacent cylinder, beginning movement of the associated slat.

As only one slat out of the group of three moves at any one time, the load on the group of slats has approximately two-thirds of its load supported by stationary slats, while only one-third is supported by a moving slat, which will allow the load to remain stationary on the two non-moving slats, thereby allowing retraction of the single, individually moving slat. This procedure is repeated until all of the slats have been shifted to their full right position. As piston 34b reaches it fully extended position, it causes system valve 68 to shift to its right, cross-over position, thereby shifting cylinders 64, 66 and switching valve 62, which results in shifting of all of the slats to the left in unison, as described in connection with FIG. 1.

The cycle is repeated as often as is necessary to fully move the load to the left of the drawing figures. It should be appreciated that such movement may be used to either load a trailer containing the system, wherein the open end of the trailer is at the right of the figure, or to unload a trailer equipped with a system, having an open end thereof at the left of the system. It should also be appreciated that they system can be used in a stationary installation.

As previously noted, in some instances, the conveyor slats may be made of flexible material. In order to maintain the slats in tension, tensioning valve 102 is moved to its closed position before deactivating the system, thereby resulting in simultaneous pressurization of both the first and second drive units, thus exerting a pulling force at both ends of any slat simultaneously. This will result in tension being placed on the slat, which will press it tight against fixed floor 72. Tensioning valve 102 must be opened prior to further operation of the system.

Figure 3:
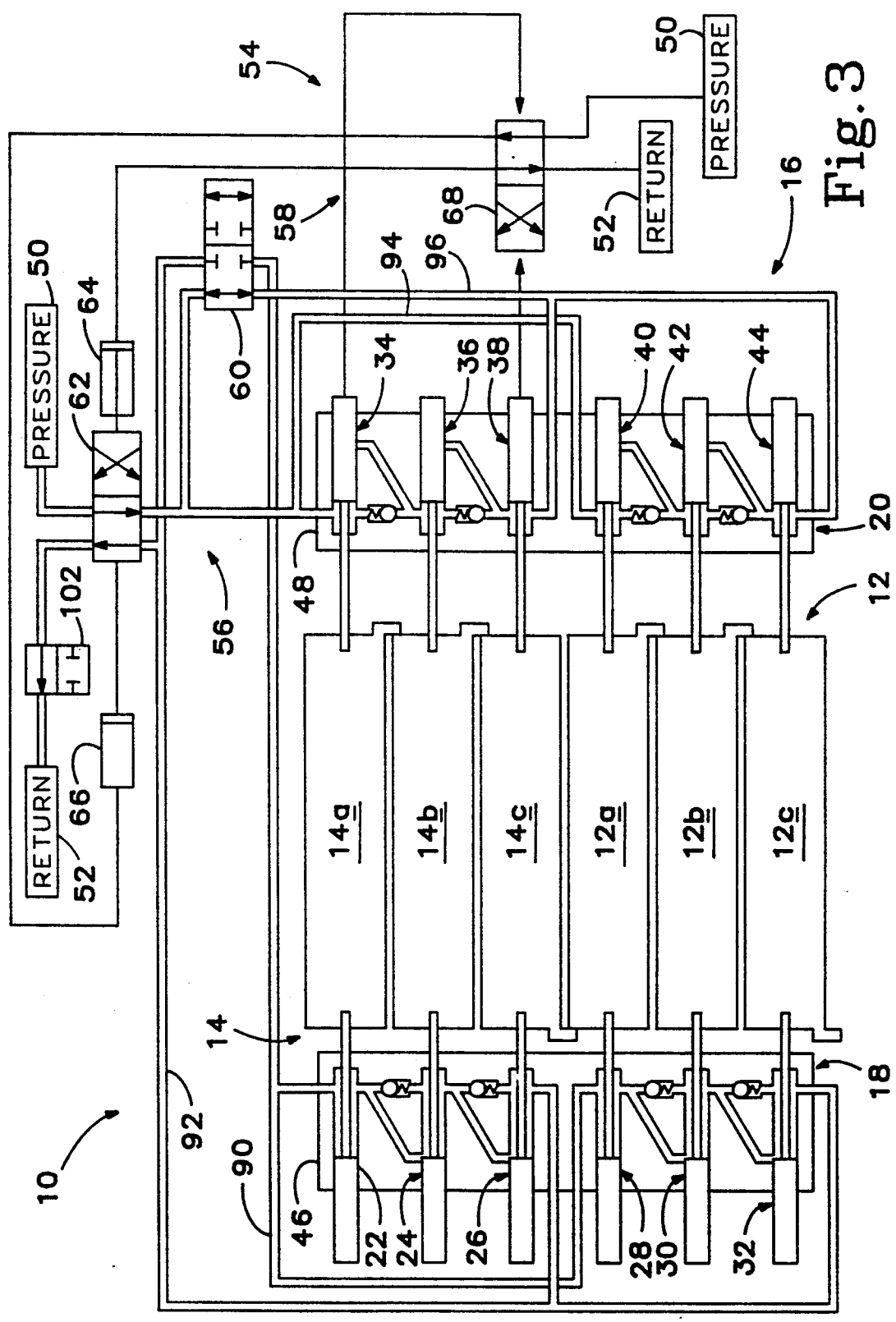
FIG. 3 depicts the embodiment of FIG. 1 with the control valves in a condition to move all of the slats to the right in unison.

Turning now to FIG. 3, directional valve 60 has been shifted to its right cross-over position, which will result in all the slats moving to the right in unison. Initially, pressure source 50 provides fluid to second drive unit 20 through conduits 94 and 96 which will simultaneously apply fluid pressure to drive devices 34 and 38, 40 and 44, because of right abutments 98 and left abutments 100, the individual slats are unable to move until all of the slats are pulled by their individual drive devices. With the fluid conduit configuration depicted drive devices 38 and 44 will tend to react to the fluid pressure first, thereby moving their associated slats. The provision of the right and left abutments will prevent this individual slat movement, thereby resulting in movement of all of the slats in unison.

Figure 4:
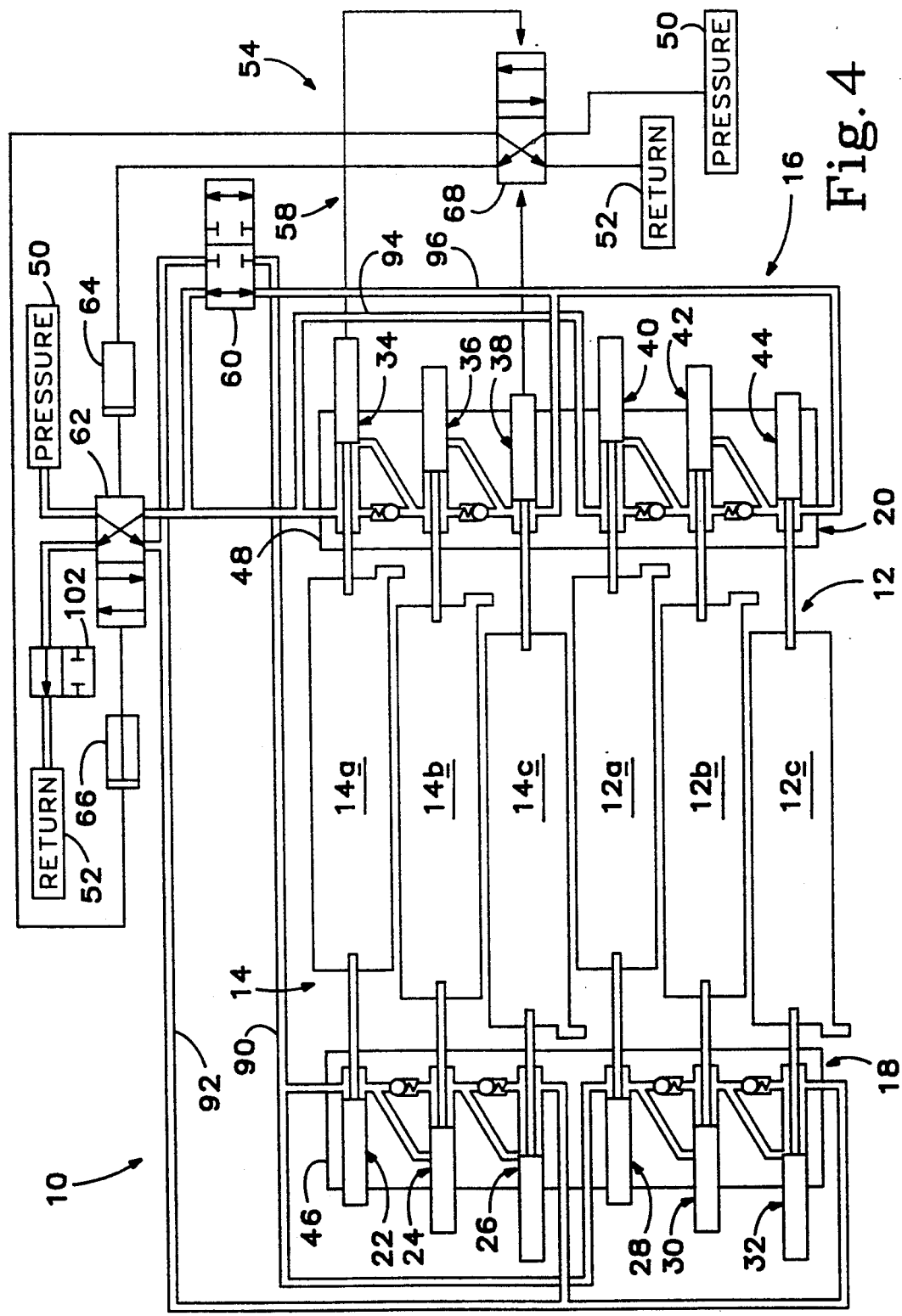
FIG. 4 depicts the embodiment of FIG. 1 with the control valves in a condition to move all the slats to the left one at a time.

At the end of its travel, piston 34b will shift system valve 68, thereby shifting cylinder 64, 66 and switching valve 62, resulting in the valve configuration depicted in FIG. 4, wherein the drive devices in first drive unit 18 are pressurized, one at-a-time, beginning with drive devices 26 and 32, thereby shifting all of the slats to the left one at-a-time. The results of the operation of the system is depicted in FIGS. 3 and 4, will result in movement of a load toward the right.

Figure 5:
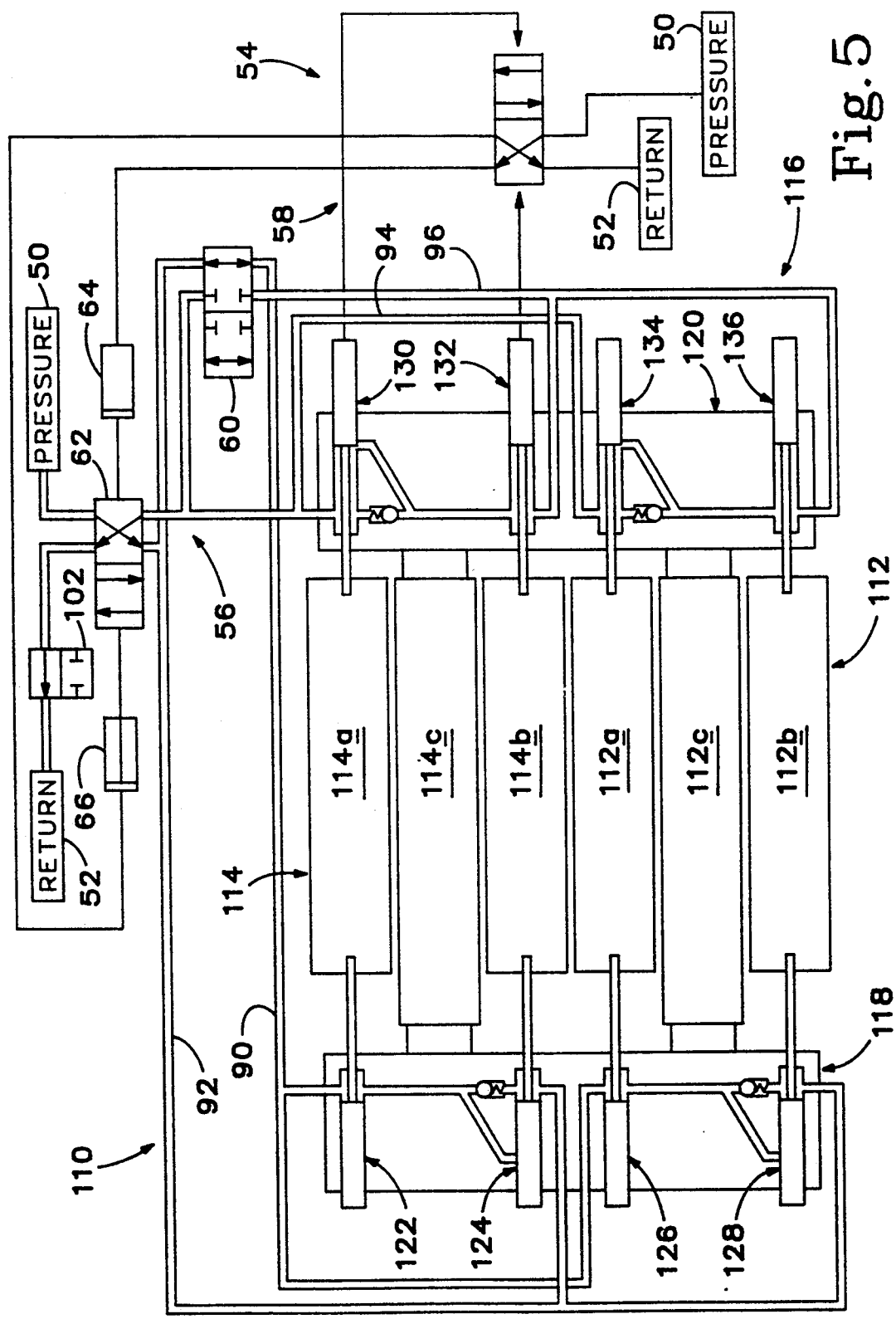
FIG. 5 depicts a second embodiment of the invention wherein some of the slats are fixed.

Referring now to FIG. 5, a modified system is depicted at 110. The modified system includes a first group of slats 112 and second group of slats 114, having moving slats 112a, 112b, 114a and 114b, which are located on either side of a stationary slat, such as slats 112c and 114c. A conveyor drive mechanism 116 is provided, which includes a first drive unit 118 and a second drive unit 120. Each drive unit includes a number of drive devices, such as drive devices 122-136.

In this configuration, the stationary slat is not connected to a drive device, and remains fixed. Although the term stationary slat is used to compare the structure to the moveable, conveyor slats, it should be appreciated that the stationary slat may be nothing more than an open space, which is in reality, fixed floor 72. In this configuration, the conveyor slats, when moving in unison, support two-thirds of the weight of the load, while one-third of the weight is born by the non-moving portion of the system. As the conveyor slats move individually, two-thirds of any part of a load will be supported by non-moving slats, thereby allowing the shifting slat to slide without moving the load. Operation of system 110 is similar to that described in connection with system 10 earlier herein.

A number of alternatives are proposed to depict how the drive units may be connected to the conveyor slats. Referring now to FIG. 8, a modified version is depicted wherein a drive device 138 is attached to one end of a conveyor slat 140, while a second drive device 142 is connected to the other end thereof. This embodiment uses the same fixed floor 72 and upper floor segments 74, 76 as depicted in the first embodiment described herein. However, the drive devices are connected to drive unit mounts 144, 146, which underlay the actual conveyor slat. This configuration may result in a slightly shorter overall dimension for the system, and still represents a pull-pull type of arrangement, when viewed from the perspective of the center of the slat relative to the ends of the slat.

Referring to FIG. 9, a flexible slat 150 is depicted trained around pulleys 152, 154 and connected to drive devices 156, 158. Flexible slat 150 is pulled at the ends thereof by drive devices 156, 158. In this type of configuration, abutments 160 may be placed on the surface of adjacent slats to interact with a complementary member on an adjacent slat. Alternately, the abutments may be provided on the piston cylinders, or may take the form of limit switches which are activated by the slat, piston or piston rod.

In some instances, it may be desirable to further reduce the overall length of the system. Referring now to FIG. 10, a drive unit 160 is depicted as being mounted vertically, and cooperating with a flexible slat 150, trained over a pulley 152. Such an arrangement may be provided at either or both ends of the system.

Another embodiment of the conveyor system utilizes a double acting cylinder in a drive unit 162 wherein one end of the piston rod is connected to a flexible slat 150, and the other end is connected to a chain 164 which is itself connected to the other end of flexible slat 150. Such a system will require additionally porting in the drive unit and selection of those ports by another valve mechanism, but such plumbing is believed to be well within the capabilities of one of ordinary skill in the art.

Although a preferred embodiment of the invention, and several variations thereof, have been disclosed, it should be appreciated that further modifications may be made to the system without departing from the scope of the invention as defined in the appended claims.

What I claim is:

1. A load conveying system comprising:
   a plurality of groups of elongate conveyors, each group including at least two elongate conveyor slats; and
   a conveyor drive mechanism including a first drive unit connected to one end of the conveyor slats and a second drive unit connected to the other end of the conveyor slats, wherein each of the drive units is constructed and arranged to independently drive at least one of the slats of a group of slats only in a single, predetermined direction.

2. The system of claim 1 wherein each drive unit includes a drive device for each slat, with the drive units being constructed and arranged to operate selectively sequentially on a group of slats or to operate in unison with other drive units on a group of slats to shift a conveyor slat along its longitudinal axis.

3. The system of claim 2 wherein the drive devices include hydraulic cylinders and the conveying system includes a hydraulic fluid pressure source.

4. The system of claim 2, further comprising a conveyor framework and wherein the drive devices are located at each end of the conveyor slats and are mounted to the framework beyond the ends of the conveyor slats for providing a pulling action on said slats.

5. The system of claim 2, further comprising a conveyor framework and wherein the drive devices are located at each end of the conveyor slats and are mounted to the framework under the ends of the conveyor slats.

6. The system of claim 1 wherein said conveyor slats are flexible.

7. The system of claim 6, further comprising a conveyor framework having a roller at one end, wherein the conveyor slats are flexibly trained over the roller, and the drive devices are located at each end of the conveyor slats and are mounted to the framework, wherein the drive unit at the one end is mounted on the frame in a vertical orientation.

8. The system of claim 1, further comprising an abutment positioned between at least two of the groups to insure simultaneous movement of at least those two slats in a single direction.

9. The system of claim 1, further comprising a control mechanism for controlling the drive mechanism, wherein the control mechanism includes a control circuit for tensioning the conveyor slats by simultaneously activating the first drive unit and the second drive unit.

10. The system of claim 1 wherein the conveyor slats are flexible.

11. A load conveying system comprising:
    a plurality of groups of elongate conveyors, each group including at least two elongate conveyor slats;
    a conveyor drive mechanism for selectively and intermittently exerting a pulling action on the ends of each of the slats; and
    a drive control for operating the drive mechanism in such a way that all of the elongate conveyors simultaneously advance from a start position in an unloading direction to an advanced position, and then the slat members of each group are sequentially returned to the start position.

12. The system of claim 11 wherein the drive mechanism includes a plurality of hydraulic cylinders, each of which drives at least one slat of a group in only a single direction.

13. The system of claim 11 wherein the drive mechanism includes at least two distinct drive modules for each group of slats, the drive modules being mounted adjacent opposite ends of the slats.

14. The system of claim 11 wherein the drive mechanism includes a plurality of hydraulic cylinders, one of which is mounted to drive at least one of the slats of a group in first direction and then another.

15. The system of claim 11, further comprising an abutment shoulder positioned between the groups of slats to insure simultaneous longitudinal driving of the groups of slats in one direction.

* * * * *